US012037847B2

(12) United States Patent
Berman et al.

(10) Patent No.: US 12,037,847 B2
(45) Date of Patent: Jul. 16, 2024

(54) WINDOW SHADE CHANNEL SYSTEM

(71) Applicant: Mechoshade Systems, LLC, Middleton, WI (US)

(72) Inventors: Joel Berman, Hewlett, NY (US); Stephen P. Hebeisen, Amawalk, NY (US); Xi Ming Liarno, Bergenfield, NJ (US); Eugene Miroshnichenko, Oceanside, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 198 days.

(21) Appl. No.: 17/328,593

(22) Filed: May 24, 2021

(65) Prior Publication Data

US 2021/0277713 A1 Sep. 9, 2021

Related U.S. Application Data

(63) Continuation of application No. 16/281,600, filed on Feb. 21, 2019, now Pat. No. 11,053,734, which is a continuation of application No. 15/435,609, filed on Feb. 17, 2017, now Pat. No. 10,253,563, which is a continuation-in-part of application No. 15/396,972, filed on Jan. 3, 2017, now Pat. No. 10,260,280.

(51) Int. Cl.
*E06B 9/58* (2006.01)

(52) U.S. Cl.
CPC .................................... *E06B 9/581* (2013.01)

(58) Field of Classification Search
CPC ............... E06B 9/581; E06B 2009/587; E06B 2009/588; E06B 9/56; E06B 9/58
See application file for complete search history.

(56) References Cited

U.S. PATENT DOCUMENTS 3,732,659 A * 5/1973 LaBarge ................. E06B 3/305 52/204.597
4,132,390 A 1/1979 Pfarr, Jr.
5,755,270 A 5/1998 Knezevich
6,119,758 A 9/2000 Coenraets
(Continued)

FOREIGN PATENT DOCUMENTS

WO WO-2013128160 A1 * 9/2013 ............... E06B 9/58

OTHER PUBLICATIONS

USPTO, Non-Final Office Action dated Nov. 5, 2018 in U.S. Appl. No. 15/396,972.
(Continued)

*Primary Examiner* — Daniel P Cahn
*Assistant Examiner* — Jeremy C Ramsey
(74) *Attorney, Agent, or Firm* — SNELL & WILMER L.L.P.

(57) ABSTRACT

A shade channel system and method provide interchangeability of use with a zippered shade and a regular or blackout shade, together with improved efficiency of installation. A guide channel accepts a shade and is configured with a tensioning mechanism to allow the guide channel to be retained at varying depths within a base channel. The system is suitable for providing polished, uniform looks throughout a room and allowing for use of standard-sized shades by allowing the guide channel to be placed at an adjustable depth within a base channel. Existing channels may be utilized, or new base channels may be coupled to existing mullions.

20 Claims, 6 Drawing Sheets

(56) References Cited

U.S. PATENT DOCUMENTS

| | | | | |
|---|---|---|---|---|
| 7,730,677 | B2 * | 6/2010 | Hansen | E01F 8/0017 52/204.593 |
| 2011/0100570 | A1 | 5/2011 | Licciardi Di Stefano | |
| 2012/0255687 | A1 | 10/2012 | Komatsu | |
| 2012/0325416 | A1 | 12/2012 | Hayashiguchi | |
| 2014/0076507 | A1 * | 3/2014 | Dibben | E06B 9/58 160/272 |
| 2015/0167382 | A1 | 6/2015 | Lombardini | |
| 2015/0345215 | A1 | 12/2015 | Roberts | |
| 2017/0044826 | A1 | 2/2017 | Nakae | |
| 2018/0094481 | A1 * | 4/2018 | Lombardini | E06B 9/58 |

OTHER PUBLICATIONS

USPTO, Non-Final Office Action dated Apr. 18, 2018 in U.S. Appl. No. 15/435,609.
USPTO, Final Office Action dated Nov. 1, 2018 in U.S. Appl. No. 15/435,609.
USPTO, Notice of Allowance dated Jan. 30, 2019 in U.S. Appl. No. 15/435,609.
USPTO, Notice of Allowance dated Mar. 5, 2019 in U.S. Appl. No. 15/396,972.
USPTO, Non-Final Office Action dated Nov. 24, 20120 in U.S. Appl. No. 16/281,600.
USPTO, Final Office Action dated Mar. 2, 2021 in U.S. Appl. No. 16/281,600.
USPTO, Notice of Allowance dated May 17, 2021 in U.S. Appl. No. 16/281,600.

* cited by examiner

WINDOW SHADE CHANNEL SYSTEM

CROSS-REFERENCE TO RELATED APPLICATIONS

This application is a continuation of, claims priority to and the benefit of, U.S. Ser. No. 16/281,600 filed Feb. 21, 2019 and entitled "Window Shade Channel System." The '600 application is a continuation of, claims priority to and the benefit of, U.S. Ser. No. 15/435,609 filed Feb. 17, 2017, now U.S. Pat. No. 10,253,563 and entitled "BASE CHANNEL COUPLING." The '609 application is a continuation-in-part of, claims priority to and the benefit of, U.S. Ser. No. 15/396,972 filed Jan. 3, 2017, now U.S. Pat. No. 10,260,280 and entitled "SYSTEMS AND METHODS FOR ROLLER BLIND CHANNEL COUPLING." All of the foregoing applications are hereby incorporated by reference for all purposes.

TECHNICAL FIELD

The disclosure generally relates to shade systems, and more particularly, to guide channels for zippered roller blinds.

BACKGROUND

Window blinds with base channels are typically used in rooms where light leaks occur between the end of the shade band and the edge of the window opening. To eliminate this light leak, the edges of the shade cloth extend into the side channels, but are not positively captured in the side channels. When the shades are subject to air flow and sudden changes in air pressure, such as those from opening and closing doors, the edges of the shade cloth are susceptible to being pulled out of the channels. In a standard zipper application for roller blinds, a single side of a zipper is coupled to each edge of a piece of shade fabric. This zipper is then captured inside a guide channel, which itself is captured inside a base channel. The guide channel and the base channel are specifically designed for one another. Prior approaches utilize secondary devices required to secure the guide channel into the base channel; additionally, there is no means for adjusting the guide channel based on the depth of the fabric required to go inside the base channel. Because the guide channel and the base channel are specifically designed to work together, in prior approaches it is not possible for a building to switch from a typical blackout/room darkening shade to a zippered shade, without having to switch out the whole base channel throughout the room or building. Additionally, the inability to adjust the guide channel to different depths can lead to certain size shades being unable to fit or a lack of uniformity of shade width throughout the room. Accordingly, improved systems and methods for zipper shades are desirable.

In prior approaches for zipper shades, a standard zipper guide channel is an insert (typically made of plastic) configured with an opening. The zipper guide channel is inserted into a secondary channel from the ends of the secondary channel, and the resulting assembly is installed into a side channel. A zipper coupled to a shade fabric is then inserted into the opening of the zipper guide channel. Compressible bumpers or other spacing components are often utilized in order to maintain a low amount of tension in the system. The shade fabric with a coupled zipper runs through a slot in the middle of the zipper guide channel.

In some prior approaches for zipper shades, a zipper guide channel and bumper assembly is inserted into the front of a base channel. In these approaches, retaining elements such as clips may be snapped onto the base channel in order to retain the zipper guide channel. In all these prior approaches, however, zipper shade applications and blackout/room darkening shade applications required separate, dedicated side channels due to the elements that are exclusive to each application.

SUMMARY

A guide channel for window shades is disclosed. The guide channel may include a channel body, an opening in the channel body for accepting an edge of a window shade and a plurality of tension mechanisms coupled to the channel body. The guide channel is inserted into a base channel such that the tension mechanisms produce tension between the guide channel and the base channel to retain the guide channel in place. The tension mechanisms may be bent spring wire, comprised of molded plastic, comprised of stamped plastic and/or may be placed at regular intervals along the channel body. The opening in the guide channel may couple to a zippered shade.

The channel system for window shades may comprise a guide channel comprising a channel body, an opening in the channel body for accepting an edge of a window shade, and a plurality of tension mechanisms coupled to the channel body. The base channel may have a flat edge. The base channel may comprise a cavity having a plurality of protrusions therein wherein, when the guide channel is inserted into the base channel, the tension mechanisms deflect to allow the guide channel to pass into the cavity of the base channel and contact the protrusions in the cavity to retain the guide channel in place. The plurality of protrusions in the base channel may allow the guide channel to be coupled to the base channel at a plurality of depths in the cavity. When the channel system is installed in a room, the flat side of the base channel may face away from an associated window and outward into the room. The base channel may be configured with a first cavity and a second cavity, wherein the guide channel is couplable to the base channel in either the first cavity or the second cavity. Moreover, a blackout shade may be receivable in the cavity not occupied by the guide channel.

A method of installing a zipper shade system may comprise: inserting a guide channel into a base channel, wherein the guide channel comprises a channel body, an opening in the channel body for accepting an edge of a window shade, and a plurality of tension mechanisms coupled to the channel body, and wherein the base channel comprises a cavity having a plurality of protrusions therein; positioning the guide channel at a first depth within the base channel such that the tension mechanisms engage one or more protrusions in the plurality of protrusions; and inserting a window shade edge into the opening in the guide channel. The method may further comprise positioning the guide channel at a second depth within the base channel such that the tension mechanisms engage one or more protrusions in the plurality of protrusions, wherein the second depth is deeper than the first depth. Moreover, the opening of the guide channel may couple to a zippered shade.

In another exemplary embodiment, a channel system for window shades comprises a guide channel comprising a channel body, an opening in the channel body for accepting an edge of a window shade, and a plurality of tension mechanisms coupled to the channel body. The system further comprises a base channel configured with a cavity having a plurality of protrusions therein. The base channel is configured with a width equal to the width of a mullion, and the base channel is configured to be coupled to the mullion via a concealed fastener. In response to the guide channel being inserted into the base channel, the tension mechanisms deflect to allow the guide channel to pass into the cavity of the base channel and contact the protrusions in the cavity to retain the guide channel in place.

In another exemplary embodiment, a method of installing a zipper shade system comprises coupling a base channel to a mullion via a concealed fastener, the base channel configured with a width equal to a width of the mullion; inserting a guide channel into the base channel, wherein the guide channel comprises a channel body, an opening in the channel body for accepting an edge of a window shade, and a plurality of tension mechanisms coupled to the channel body, and wherein the base channel comprises a cavity having a plurality of protrusions therein; positioning the guide channel at a first depth within the base channel such that the tension mechanisms engage one or more protrusions in the plurality of protrusions; and inserting a window shade edge into the opening in the guide channel.

BRIEF DESCRIPTION OF THE DRAWINGS

A more complete understanding of principles of the present disclosure may be derived by referring to the detailed description and claims when considered in connection with the Figures, wherein like reference numbers refer to similar elements throughout the Figures, and where:

Figure 1A:
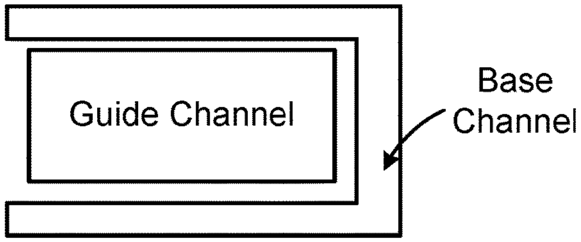
FIG. 1A illustrates a window shade channel system, in accordance with various embodiments.

It should be appreciated by one of ordinary skill in the art that, while principles of the present disclosure are described with reference to the figures described above, such principles may also include a variety of embodiments consistent with the description herein. It should also be understood that, where consistent with the description, there may be additional components not shown in the system diagrams, and that such components may be arranged or ordered in different ways.

DETAILED DESCRIPTION

The detailed description shows embodiments by way of illustration, including the best mode. While these embodiments are described in sufficient detail to enable those skilled in the art to practice the principles of the present disclosure, it should be understood that other embodiments may be realized and that logical and mechanical changes may be made without departing from the spirit and scope of principles of the present disclosure. Thus, the detailed description herein is presented for purposes of illustration only and not of limitation. For example, the steps recited in any of the method descriptions may be executed in any order and are not limited to the order presented.

Moreover, for the sake of brevity, certain sub-components of individual components and other aspects of the system may not be described in detail herein. It should be noted that many alternative or additional functional relationships or physical couplings may be present in a practical system. Such functional blocks may be realized by any number of components configured to perform specified functions.

The shade systems include zipper shade applications and blackout/room darkening applications that may shade a common side channel, reducing system costs and allowing re-use of existing side channels. Additionally, exemplary shade systems disclosed herein allow for adjustment of the depth of the shade fabric into the side channel, allowing a fixed-size shade fabric to be fitted to a variety of window sizes.

Moreover, the shade system allows a guide channel to be inserted and secured to a side channel without (or with minimal) use of any external devices. Additionally, an exemplary guide channel may be inserted into a side channel to an adjustable and/or variable depth, without any (or little) need to change any elements in the guide channel or making any (or little) changes to the profile of the side channel. In this manner, a single shade system may be capable of properly fitting and operating in a variety of window sizes.

Yet further, the system permits a common side channel to be utilized in blackout/room darkening or zipper shade applications. Correspondingly, a shade system that utilizes a side channel in a blackout/room darkening application may be converted into a zipper shade system without a need to change the side channel.

These and other advantages and improvements over prior approaches may be realized via application of principles of the present disclosure. For example, while previously a zipper base channel was a separate element attached to the curtain wall or mullion of a building, this shade system allows a recess (i.e., to function as a base channel) to be included into the curtain wall or mullion itself such that: (i) the recess may be utilized in a blackout/room darkening shade application and/or for recessing shade fabric in a non-retaining manner; and (ii) in the event of air pressure or airflow causing the shade fabric to come out of the recess, a zipper guide channel may be inserted into the recess, thereby converting the recess from functioning simply as a blackout channel into a zipper retaining channel configured to positively retain the shade fabric. In other words, a zipper shade system no longer requires a multi-part extrusion, but can be configured as an integral part of a building structure.

Figure 1B:
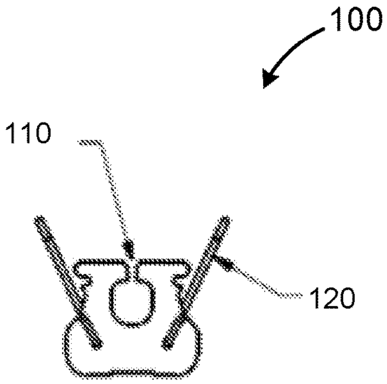
FIG. 1B illustrates a top view of a guide channel with tension mechanisms and an opening for the edge of a shade, in accordance with various embodiments.

With reference now to FIG. 1A, in various embodiments, a window shade channel system comprises a guide channel and a base channel. The guide channel is configured to couple to a window shade. The base channel is configured to receive the guide channel in order to facilitate retaining of window shade fabric in a desired location. In various embodiments, a device or mechanism may exist outside of the base channel that partially or fully secures the guide channel. In various embodiments, the mechanism may include a securing element such as, for example, a screw, a clip or an adhesive. Any other method of securing the guide channel can also be used. In various embodiments, no securing element may be included. Turning now to FIG. 1B, in various embodiments, a guide channel 100 is configured with an opening 110 and one or more tension mechanisms 120. Opening 110 is capable of accepting an edge of a shade. In certain embodiments, opening 110 is capable of coupling to a shade edge that has a zipper affixed to the edge.

Continuing with reference to FIG. 1B, and in accordance with various embodiments, tension mechanisms 120 are configured to produce tension between guide channel 100 and a base channel, allowing guide channel 100 to remain in place relative to the base channel. Tension mechanisms 120 can be made of any material capable of compressing to allow for insertion and returning to the original shape in order to provide tension. For example, in some embodiments tension mechanisms 120 comprise bent spring wire. In other embodiments, tension mechanisms 120 can be made from molded or stamped plastic. Moreover, any suitable configuration or composition for tension mechanisms 120 may be utilized, as desired.

Figure 2:
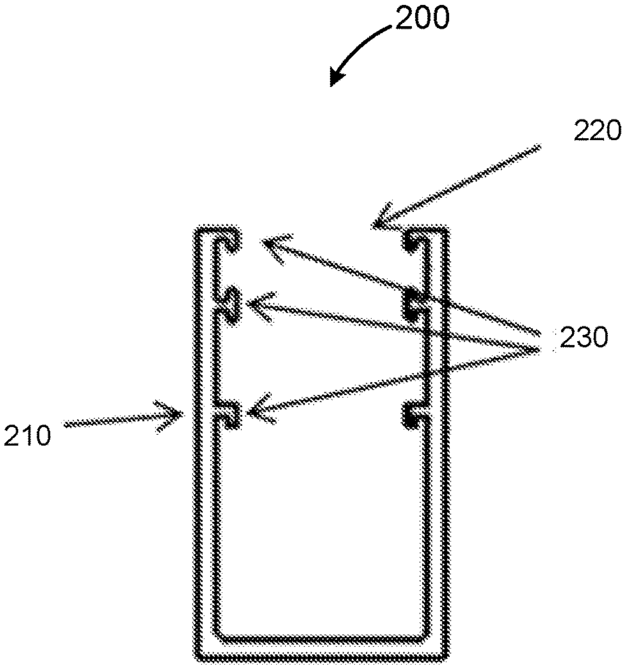
FIG. 2 illustrates a top view of a base channel showing the opening into which the guide channel is inserted and multiple levels of protrusions within the opening that contact tension mechanisms of the guide channel, allowing the guide channel to be adjusted to varying depths within the base channel, in accordance with various embodiments.

With reference now to FIG. 2, in various embodiments, a base channel 200 is configured with one or more flat edge 210, an opening 220, and a plurality of protrusions 230 within the opening. In a specific embodiment, when base channel 200 is installed, flat edge 210 will face out into the room so as to provide a polished finish look throughout the room. Opening 220 (and/or the associated cavity in base channel 200) is configured to receive a guide channel, for example guide channel 100 as depicted in FIG. 1B. Opening 220 is configured to be narrower than the fully extended width of tension mechanisms 120 as depicted in FIG. 1B. In various embodiments, there is only one level of protrusions 230 in the opening 220. In various embodiments, there are multiple levels of protrusions 230 in the opening 220, as depicted. In various embodiments, base channel 200 is configured to lack any protrusions 230. Base channel 200 may be configured with internal channels, trenches, or grooves to allow for the use of pile or brush near opening 220.

Figure 3A:
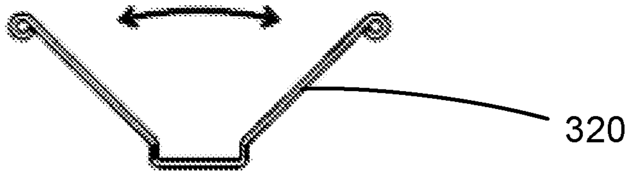
FIGS. 3A through 3D illustrate exemplary configurations of tension mechanisms of a guide channel, in accordance with various embodiments.
Figure 3B:
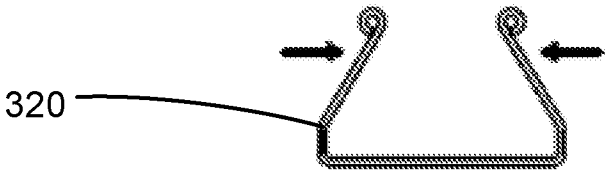
Figure 3C:
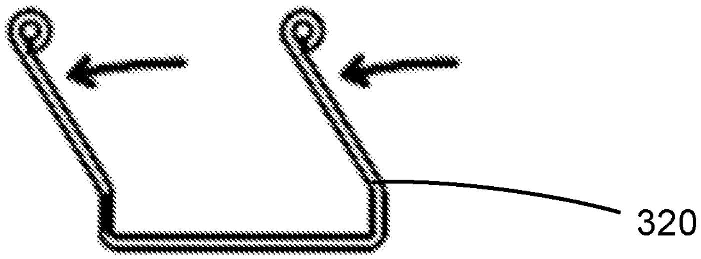

Turning now to FIG. 3A, in various embodiments a tensioning mechanism 120, for example tensioning mechanism 320, may be configured to exert an outward force or forces (i.e., the direction of the arrows indicates the direction of the forces exerted by tensioning mechanism 320). With momentary reference to FIG. 3B, tensioning mechanism 320 may be configured to exert an inward force or forces (i.e., the direction of the arrows indicates the direction of the forces exerted by tensioning mechanism 320). As seen in FIG. 3B, tensioning mechanism 320 may be configured to exert an inward force or forces (i.e., the direction of the arrows indicates the direction of the forces exerted by tensioning mechanism 320). Moreover, as seen in FIG. 3C, tensioning mechanism 320 may be configured to exert a lateral force or forces (i.e., the direction of the arrows indicates the direction of the forces exerted by tensioning mechanism 320).

Figure 3D:
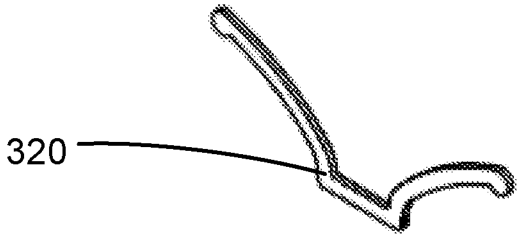

FIG. 3D illustrates another exemplary embodiment of a tensioning mechanism 120, for example tensioning mechanism 320. In various embodiments, as depicted, tensioning mechanism 320 may be made out of molded or stamped plastic or other suitable material.

Figure 4:
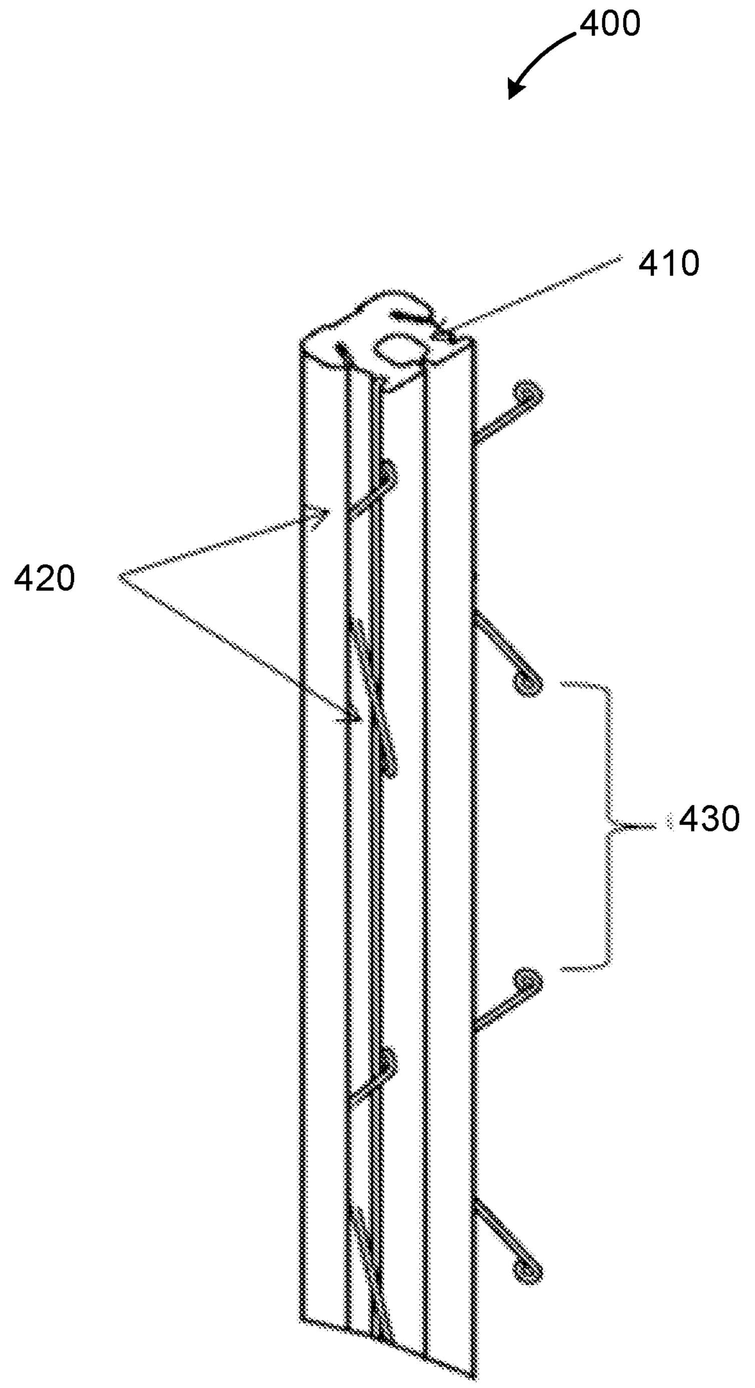
FIG. 4 illustrates a side view of a guide channel with tension mechanisms positioned at various intervals along the guide channel, in accordance with various embodiments.

Turning now to FIG. 4, in various embodiments, a guide channel 100, for example guide channel 400, may be configured with any length suitable to cover a desired portion of a window, for example the full length of the window. Guide channel 400 is configured with an opening 410 and a plurality of tensioning mechanisms 420. Tensioning mechanisms 420 are placed at an interval 430 from one another along the length of guide channel 400. Interval 430 may be uniform; alternatively, interval 430 may vary, for example in order to provide increased retaining force at certain locations on guide channel 400.

Figure 5A:
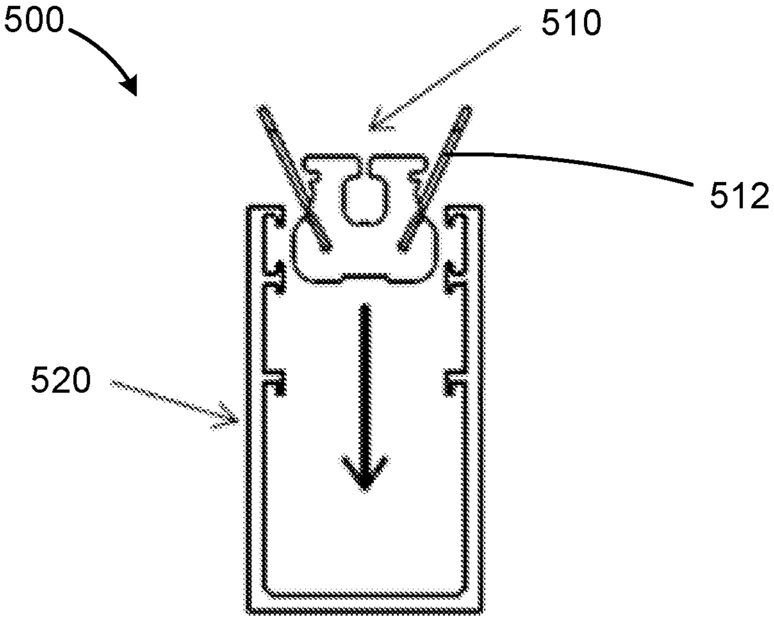
FIG. 5A illustrates a top view of a guide channel with tension mechanisms being inserted into a base channel configured with various protrusions, in accordance with various embodiments.
Figure 5B:
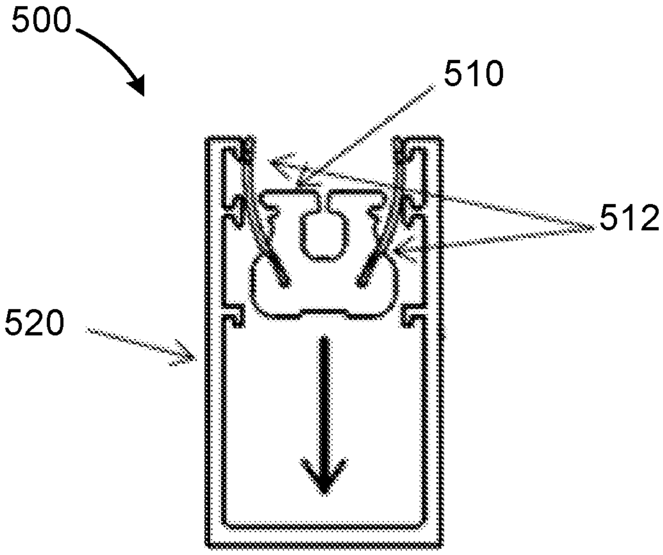
FIG. 5B illustrates a top view of a guide channel with tension mechanisms being inserted into a base channel and the tension mechanisms flexing in order to allow the guide channel to fit through the protrusions in the base channel opening, in accordance with various embodiments.

With reference now to FIGS. 5A and 5B, in various embodiments, a shade system 500 comprises a guide channel 510 which is insertable into a corresponding base channel 520 in the direction of the arrow as shown. During insertion, as shown in FIG. 5B, tensioning mechanisms 512 compress to allow for insertion into (and retention within) base channel 520.

Figure 5C:
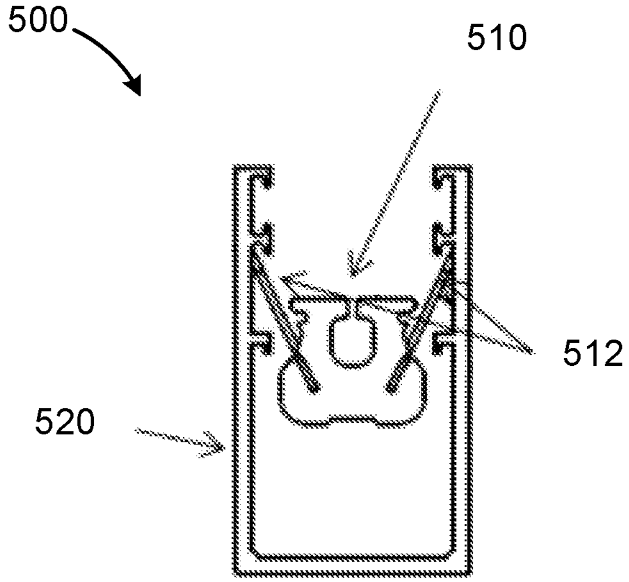
FIG. 5C illustrates a top view of a guide channel at a shallow depth within a base channel with tension mechanisms providing tension to maintain the guide channel's depth within the base channel, in accordance with various embodiments.

Turning now to FIG. 5C, in various embodiments, guide channel 510 may be inserted into base channel 520 to a first, shallow depth. Tensioning mechanisms 512 expand to put tension on base channel 520 to hold guide channel 510 in place at the selected depth.

Figure 5D:
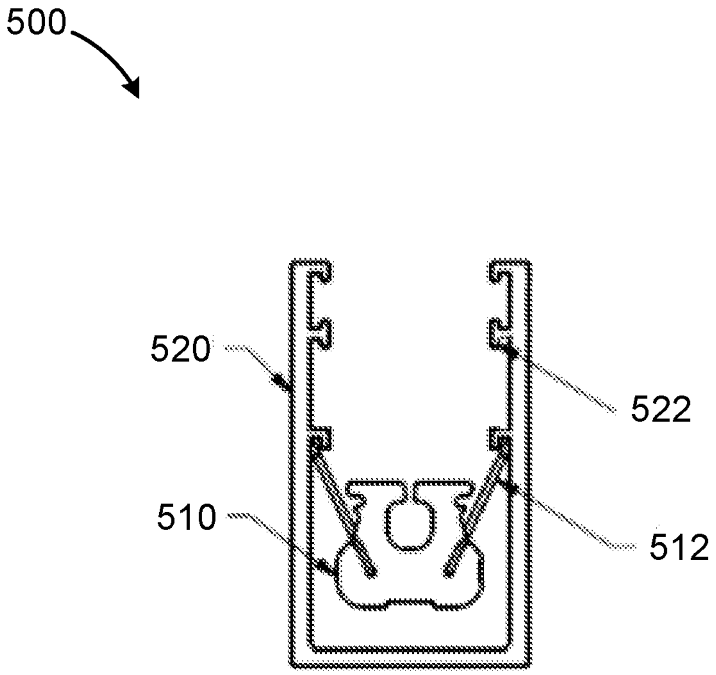
FIG. 5D illustrates a top view of a guide channel at a deep depth within a base channel with tension mechanisms providing tension to maintain the guide channel's depth within the base channel, in accordance with various embodiments.

With reference to FIG. 5D, guide channel 510 may be inserted into base channel 520 at a second, deeper depth. Tensioning mechanisms 512 expand to put tension on base channel 520 to hold guide channel 510 in place at the selected depth. Base channel 520 may be configured with a plurality of protrusions 522 that come into contact with tensioning mechanisms 512 from guide channel 510 in such a way as to hold guide channel 510 at a specific depth. This contact can be accomplished in various ways. For example, tensioning mechanisms 512 can clip into protrusions 522. Alternatively, tensioning mechanisms 512 can hook into protrusions 522. Moreover, any suitable contact and/or retaining/releasing approach may be utilized. It will be appreciated that base channel 520 may be configured to couple to guide channel 510 at a plurality of fixed depths (for example, a first depth, a second deeper depth, a third still deeper depth, and so on); moreover, base channel 520 may be configured to couple to guide channel 510 at any position along a continuum of depths. In this manner, by selecting the depth of the coupling between guide channel 510 and base channel 520, appropriate tension on the shade cloth may be maintained. Additionally, a fixed-width shade cloth may thus be suitable to use on a variety of window sizes, by selecting an appropriate insertion depth.

Figure 5E:
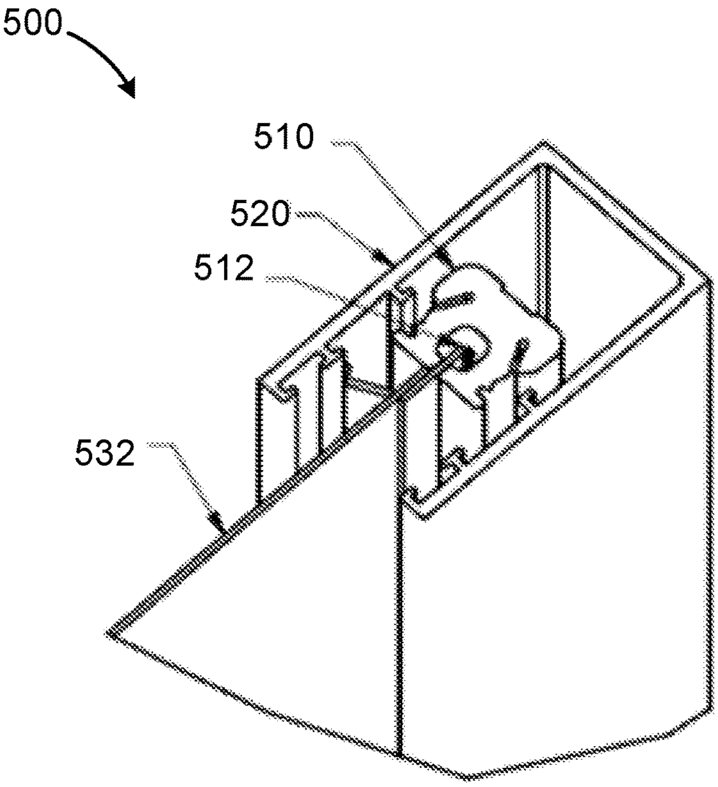
FIG. 5E illustrates a side view of a guide channel system complete with a shade edge where a guide channel is placed at a certain depth within a base channel and the shade's edge is inserted into the opening of the guide channel, in accordance with various embodiments.

Turning now to FIG. 5E, in various embodiments guide channel system 500 is illustrated in connection with a shade edge 532 of a window shade fabric. Shade edge 532 is inserted into opening 512 of guide channel 510, and guide channel 510 is placed at a desired depth inside of base channel 520.

In various embodiments, a single shade system may be utilized in connection with a single window. Alternatively, multiple shade systems may be utilized in connection with a single window. For example, in one embodiment, two shade systems can be used, one in front of the other, to employ a blackout shade in addition to a regular shade.

Figure 6:
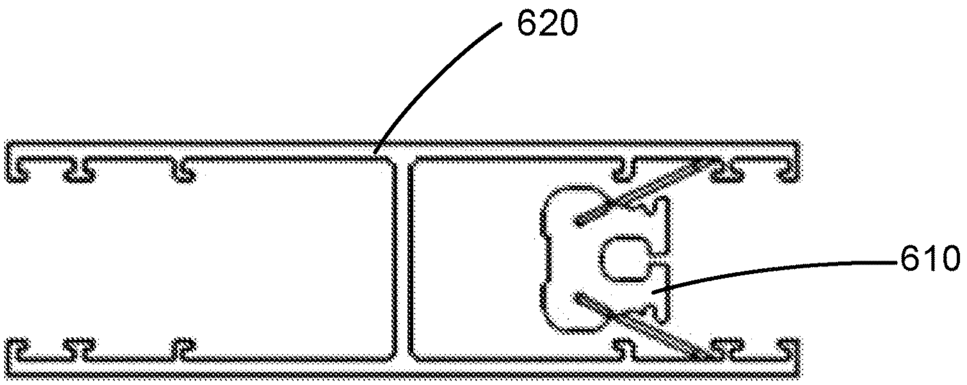
FIG. 6 illustrates a top view of a guide channel system which allows for two base channels to be placed back-to-back, allowing for either a room darkening/blackout or zippered shade to be placed in either side, in accordance with various embodiments.

In various embodiments, shade systems may be linked together and/or span multiple windows. For example, with reference to FIG. 6, a base channel 620 may be configured to receive a first guide channel 610 on a first side, as well as a second guide channel 610 (not shown in FIG. 6) on a second, opposite side. In this manner, adjacent shades may be linked in a gapless manner. In various embodiments, a zipper shade may be utilized in connection with one side of base channel 620, and a blackout shade may be utilized in connection with the other side of base channel 620. In various embodiments, the two channels as shown in FIG. 6 may be stacked on top of one another, such that a solar and blackout shade can be included in the same system. In various embodiments, the two channels may be produced as a single piece of extrusion and still provide the two channels in a stacked configuration.

In various embodiments, a guide channel as disclosed herein may be utilized in connection with a base channel pre-existing in a building. In this manner, expenses associated with upgrades and/or revisions to building shading capabilities may be reduced.

In various embodiments, a channel system (e.g., for a window shade) may be configured to utilize a base channel which is coupled to and/or installed separately from originally constructed portions of a building, for example mullions. For example, a window shade channel system may utilize a base channel that is substantially the same width as the mullion(s) associated with a series of windows. A base channel may be coupled to an existing mullion, for example via a snap-in fastener (e.g., concealed snap-in fastener), a double-faced adhesive tape, or other suitable coupling. The base channel may be a similar width as the constructed channel or the base channel can be a different width if it is acceptable to change the general appearance of the design. As such, through the use of a base channel having a width similar to an existing mullion width, together with the use of an inconspicuous fastening approach, base channels may be added to a building while preserving (or minimally impacting) the general appearance of the original design. In this manner, a building may utilize advantages associated with zipper shades even if the original building configuration was not suitable for installation of zipper shades.

Exemplary base channels suitable for use in this manner may be configured with a single opening (e.g., for use at the end of a series of shades), two opposing openings (e.g., for use in receiving a shade for each window on either side of a mullion), a pair of openings on a common side (e.g., for use in receiving a primary shade and a blackout shade at the end of a series), and/or two pairs of opposing openings (e.g., for use in receiving a primary shade and a blackout shade for each window on either side of a mullion). Stated another way, exemplary base channels may be configured to be "center" sections between shades, or "end" sections at one side of a shade or shades. Moreover, each opening in an exemplary base channel (e.g., base channel 200, 520, 620, and/or the like) may be configured to accept a corresponding guide channel (e.g., guide channel 100, 400, 510, 610, and/or the like as disclosed herein).

In various embodiments, a base channel is configured with a width of four inches so as to be suitable for use in connection with a mullion having a width of four inches. The base channels may be generally rectangular in shape. However, any suitable size, shape, composition and/or dimensions may be utilized, as desired.

It will be appreciated that window shade channel systems as disclosed herein are suitable for use regardless of the orientation of a particular window. For example, exemplary window shade channel systems are suitable for use in connection with vertical windows, horizontal windows, sloped windows, and/or the like.

While the steps outlined herein represent embodiments of principles of the present disclosure, practitioners will appreciate that there are a variety of physical structures and interrelated roller shade components that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Exemplary systems and methods are disclosed. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A system comprising:

a guide channel having an opening configured for accepting a window shade along a length of the guide channel such that the window shade is inserted along the length of the guide channel;

a base channel having a length and depth, wherein the base channel includes side walls and a cavity configured to receive the guide channel; and one or more arms on the guide channel that are configured to assert a lateral force against the side walls of the base channel, wherein the one or more arms extend away from a center of the guide channel such that the one or more arms are configured to be compressed toward the center of the guide channel, in response to insertion into the base channel, wherein the one or more arms are configured to be separated away from the center of the guide channel and interface with the base channel, in response to placement of the guide channel at a first location along the depth of the base channel or in response to placement of the guide channel at a second location along the depth of the base channel, wherein in a first configuration each of the one or more arms is configured to interface with the base channel at the first location along the depth of the base channel, and wherein in a second configuration each of the one or more arms is configured to interface with the base channel at the second location along the depth of the base channel.

2. The system of claim 1, wherein the one or more arms include one or more spring elements.

3. The system of claim 1, wherein an end of each of the one or more arms is configured to interface with one or more protrusions emanating from the base channel.

4. The system of claim 1, wherein an end of each of the one or more arms is configured to interface with one or more protrusions emanating from an inside surface of the base channel.

5. The system of claim 1, wherein an end of each of the one or more arms is configured to interface with one or more protrusions emanating from the base channel at intervals along the length of the base channel.

6. The system of claim 1, wherein a first arm of the one or more arms is configured to interface with a first protrusion emanating from a first side of the base channel and a second arm of the one or more arms is configured to interface with a second protrusion emanating from a second side of the base channel.

7. The system of claim 1, wherein a first arm of the one or more arms is configured to interface with a first protrusion emanating from a first side of the base channel, and a second arm of the one or more arms is configured to interface with a second protrusion opposing the first protrusion and emanating from a second side of the base channel.

8. The system of claim 1, wherein the window shade is movable along the length of the guide channel.

9. The system of claim 1, wherein each of the one or more arms is configured to deflect to allow the guide channel to pass into the base channel and expand to retain the guide channel in place.

10. The system of claim 1, wherein each of the one or more arms is configured to be spaced along the length of the base channel.

11. The system of claim 1, wherein each of the one or more arms is configured to be spaced at intervals along the length of the base channel.

12. The system of claim 1, wherein the guide channel and the one or more arms are fully received within the base channel when the one or more arms interface at at least one of the first location or the second location along the depth of the base channel.

13. The system of claim 1, wherein each of the one or more arms is comprised of at least one of bent spring wire, stamped plastic or molded plastic.

14. The system of claim 1, wherein the guide channel is configured to be inserted into the base channel at at least one of the first location or the second location along the depth of the base channel.

15. The system of claim 1, wherein the one or more arms interface with one or more protrusions emanating from the base channel and allow the guide channel to be coupled to the base channel at a plurality of depths in the cavity of the base channel.

16. The system of claim 1, wherein the base channel includes a first base channel and a second base channel, wherein the guide channel is configured to be coupled to the first base channel, and wherein a blackout shade is receivable in the second base channel.

17. The system of claim 1, wherein the base channel is configured to be at least one of coupled to and coextensive with a mullion, or coupled to a mullion via a concealed fastener.

18. The system of claim 1, wherein each of the one or more arms is configured to interface with the base channel by at least one of clipping into or hooking into the base channel.

19. A system comprising:

a guide channel having an opening configured for accepting a window shade along a length of the guide channel such that the window shade is inserted along the length of the guide channel;

a base channel having a length and depth, wherein the base channel includes a cavity configured to receive the guide channel; and one or more arms on the guide channel, wherein the one or more arms are located at intervals along guide channel, wherein the one or more arms extend away from a center of the guide channel such that the one or more arms are configured to be compressed toward the center of the guide channel, in response to insertion into the base channel, wherein the one or more arms are configured to be separated away from the center of the guide channel and interface with the base channel, in response to placement of the guide channel at a first location along the depth of the base channel or in response to placement of the guide channel at a second location along the depth of the base channel, wherein in a first configuration each of the one or more arms is configured to interface with the base channel at the first location along the depth of the base channel, and wherein in a second configuration each of the one or more arms is configured to interface with the base channel at the second location along the depth of the base channel.

20. A system comprising:

a guide channel having an opening configured for accepting a window shade along a length of the guide channel such that the window shade is inserted along the length of the guide channel;

a base channel having a length and depth, wherein the base channel includes a cavity configured to receive the guide channel; and one or more arms on the guide channel, wherein the one or more arms extend away from a center of the guide channel such that in a first configuration each of the one or more arms is configured to compress laterally inward for insertion into the base channel, wherein the one or more arms are configured to be separated away from the center of the guide channel and to interface with the base channel at a first location along the depth of the base channel, in response to placement of the guide channel at the first location along the depth of the base channel, and wherein the one or more arms are configured to be separated away from the center of the guide channel and to interface with the base channel at a second location along the depth of the base channel, in response to placement of the guide channel at the second location along the depth of the base channel.

* * * * *